United States Patent

[11] 3,608,931

| [72] | Inventors | Arnold Burton Skromme<br>Moline;<br>Dennis Albert Kerckhove, East Moline, Ill.;<br>Donald Thomas Sorlie, Ankeny, Iowa |
|---|---|---|
| [21] | Appl. No. | 885,023 |
| [22] | Filed | Dec. 15, 1969 |
| [45] | Patented | Sept. 28, 1971 |
| [73] | Assignee | Deere & Company<br>Moline, Ill. |

[54] HITCH SAFETY CHAIN
12 Claims, 6 Drawing Figs.

| [52] | U.S. Cl. | 280/457, 24/241 SL |
|---|---|---|
| [51] | Int. Cl. | B60d 1/12 |
| [50] | Field of Search | 280/457, 480; 24/241 SL, 241 R, 238 |

[56] References Cited
UNITED STATES PATENTS

| 2,668,720 | 2/1954 | Finch | 280/457 X |
| 2,954,988 | 10/1960 | Hallock | 280/457 |
| 3,125,355 | 3/1964 | Snuggins | 280/457 |

FOREIGN PATENTS

| 1,055,646 | 10/1953 | France | 24/241 SL |

Primary Examiner—Leo Friaglia
Attorneys—H. Vincent Harsha, Harold M. Knoth, William A. Murray, John M. Nolan and Jimmie R. Oaks ABSTRACT: A hitch safety chain is provided for connection between towed and towing vehicles. The chain has a grabhook at one end and the grabhook includes a releasable latch for closing the throat of the hook portion to retain a link of the chain therein. At the other end of the chain is an enlarged passing or connecting link which may be either welded or bolted to a draft member of the towed vehicle or through which the grabhook may be passed to loop or wrap the safety chain about the draft member of the towed vehicle.

PATENTED SEP28 1971

3,608,931

INVENTORS.
A. B. SKROMME
D. A. KERCKHOVE
D. T. SORLIE

:::: {.page}
3,608,931

HITCH SAFETY CHAIN

BACKGROUND OF THE INVENTION

This invention relates to a hitch safety chain and more specifically relates to a chain having a grabhook at one end, the grabhook carrying a releasable latch, and having an enlarged connecting or passing link at the other end, the link being specially configured for permitting different modes of connecting the safety chain to a towed vehicle.

The primary purpose of a hitch safety chain is to provide a safety or backup connection between towed and towing vehicles when the vehicles are being operated on roadways or highways. The safety chain retains the towed vehicle in supported relationship to the towing vehicle in case the primary hitch connection fails or otherwise becomes disconnected, and in so doing prevents possible damage to the towed vehicle or accidents which might result from the towed vehicle breaking free from the towing vehicle.

Known safety chains have grabhooks which carry relatively complicated latches and these safety chains are not adapted for various modes of connection to draft members of towed vehicles as is desired for wide application of the safety chain.

SUMMARY OF THE INVENTION

According to the present invention, it is an object to provide a hitch safety chain with a grabhook that carries a releasable latch for closing the throat opening of the hook and more specifically it is an object to provide a latch which is simple, reliable and inexpensive.

Another object of the invention is to provide a safety chain that is adaptable for different modes of connection between towed and towing vehicles and more specifically it is an object of the invention to provide an enlarged passing or connecting link at one end of the chain, which passing link may be either welded or bolted to a draft member of the towed vehicle or through which the grabhook may be passed for looping or wrapping the chain about the draft member.

These and other objects will become apparent from the ensuing description and accompanying drawings.

DESCRIPTION OF THE PREFERRED EMBODIMENT

Figure 2:
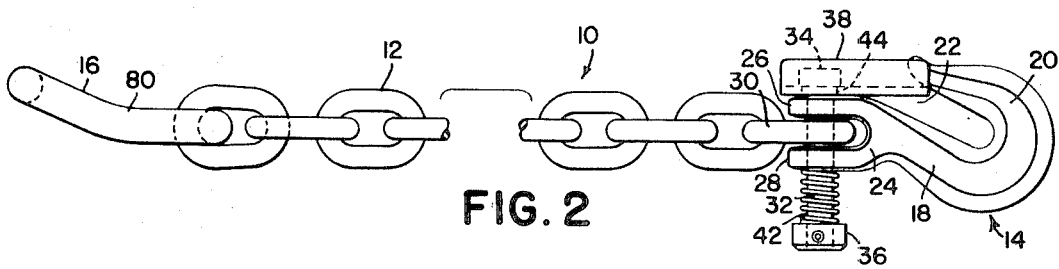
FIG. 2 is a side view of the safety chain showing the latch member in the latched position closing the throat entrance of the hook.

A hitch safety chain constructed according to the principles of the present invention is illustrated in FIG. 2 and is designated in its entirety by the numeral 10. The safety chain 10 includes a length of log or proof-coil chain 12, a grab hook 14 and an enlarged passing or connecting link 16.

The grabhook 14 includes an elongated shank 18 terminating at one end in a back-turned hook 20 defining a throat 22 between the free end of the hook and adjacent shank portions. The other end of the shank is bifurcated as at 24 and includes upper and lower apertured furcations 26 and 28 between which are received an end link 30 of the chain 12. A connecting pin 32 having a head 34 at its upper end and a retaining nut 36 at its lower end is received in the apertured furcations and thus pivotally connects the grabhook 14 to the end link 30.

The pin 32 also acts to hold an upwardly opening channel-shaped latch member 38 in bearing relationship to the upper furcation 26 of the grabhook 14 and to this end extends through an elongated keyhole-shaped aperture 40 in the web of the latch member. A compression spring 42 acts between the retaining nut 36 and the lower furcation 28 to bias the pinhead 34 against the latch member 38. The latch member 38 is shiftable along the major axis of the aperture 40 between a latched position, illustrated in FIG. 2, wherein the pin 32 occupies the left or large end of the aperture 40, the flanges of the latch member are on opposite sides of the end of the hook 20 and the latch members blocks the entrance to the throat 22, and a released position wherein the pin 32 occupies the right or small end of the aperture 40 and the flanges are clear of the hook 14 to permit the latch member to be rotated about the pin 32 and open the entrance to the throat 22. To ensure that the latch member does not shift prematurely to the released position, the pin 32 has a shoulder 44 adjacent the head 34, which shoulder fits the large end of the aperture and is too large to pass into the small end. Thus, once the shoulder is in the large end of the aperture 40, it will be retained therein by the biasing action of the spring 42. The pin may be shifted axially against the bias of the spring 42 to clear the shoulder 44 from the aperture 40 to permit the latch member to be shifted under the shoulder to the released position.

Figure 1:
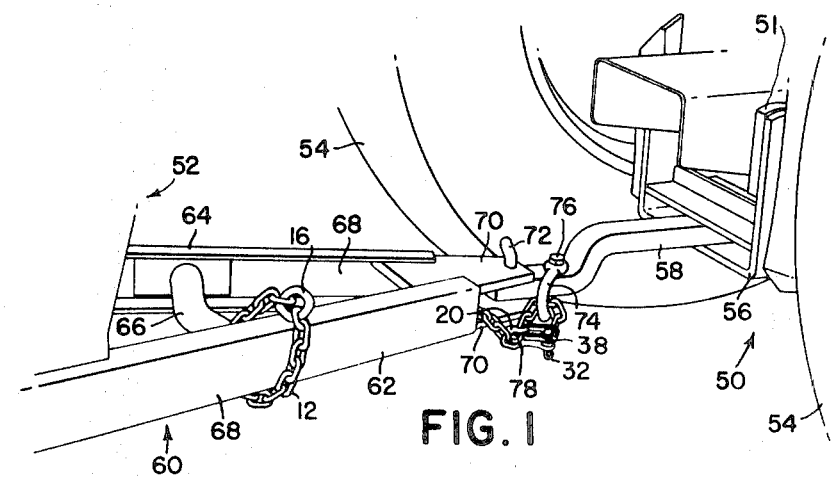
FIG. 1 is a perspective view showing the rear of a tractor-type towing vehicle and the draft hitch of a typical towed vehicle and showing a safety chain constructed according to the principles of the invention wrapped around a draft member of the hitch.

A representative towed and towing vehicle and one mode of connecting a safety chain therebetween is illustrated in FIG. 1 wherein there is shown the rear portion of a tractor-type towing vehicle 50 and a forward portion of a typical towed vehicle 52. The tractor 50 includes a frame 51, the rear of which is supported on drive wheels 54 and the legs of a U-shaped bracket 56 are connected to the frame 51. A drawbar 58 is pivotally connected to the underside of the tractor frame in a conventional manner not shown and is supported by the bracket 56.

The towed vehicle 52 has a hitch 60 that includes right and left forwardly converging channel members 62 and 64. The channel members open inwardly towards each other and a cross brace 66 has opposite ends secured to the webs 68 of the channel members. Opposed vertically spaced horizontal plates 70 join the front ends of the channel members 62 and 64. The tractor drawbar 58 is received between the plates 70 and the drawbar and plates are apertured and a pin 72 is received in the apertures to form a primary connection between the towed and towing vehicles.

The safety chain 10 is connected between the towed and towing vehicles to provide a safety or backup connection to the primary connection. The chain 10 is shown connected in a first mode wherein the passing link carrying end of the chain 10 is wrapped or looped around the right channel member 62 behind the cross brace 66, the loop being formed by passing the grabhook 14 through the passing link 16. The grabhook carrying end of the chain is doubled back through a clevis 74 pivotally connected to the tractor drawbar 58 by means of a pin 76. A link 78 of the length of chain 12 is received in the throat 22 of the hook 20 and captively held therein by the latch member 38.

Figure 5:
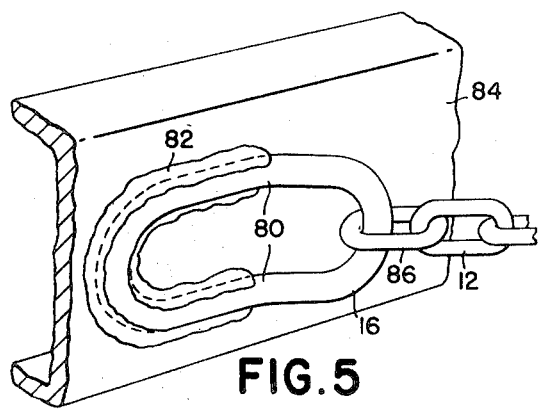
FIG. 5 shows the enlarged passing link welded to a draft member of a towed vehicle.
Figure 3:
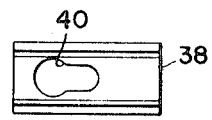
FIG. 3 is a top view of the latch member shown in FIG. 2.
Figure 4:
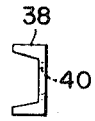
FIG. 4 is an end view of the latch member shown in FIG. 3.
Figure 6:
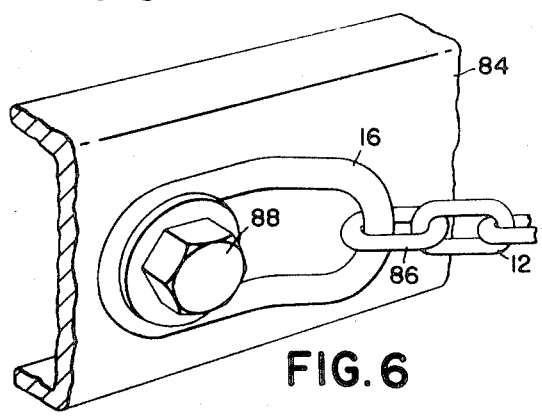
FIG. 6 is a view similar to FIG. 5 but showing the passing link bolted to the draft member.

The passing link 16 is transversely bent, as at 80, approximately midway between its ends so as to angularly offset one end from the other. This construction of the passing link 16 is conducive for connecting the safety chain 10 to a hitch member of a towed vehicle according to second and third modes illustrated in FIGS. 5 and 6. In FIG. 5, the passing link 16 is shown with one end welded as at 82 to a hitch member 84. The other end of the passing link extends outwardly from the hitch member 84 so as to permit free pivoting of an end link 86 of the chain 12. The mode of connection in FIG. 6 is similar to that illustrated in FIG. 5, however, instead of connecting the passing link by a weldment, a bolt 88 extends through one end of the passing link and secures it against the hitch member 84.

The foregoing is thought to be a sufficient explanation of the operation of the invention with the further remarks that
::::

selection of a mode of connecting the safety chain between towed and towing vehicles depends largely upon the configurations of the hitch structures of the respective vehicles and, by virtue of the adaptability of the safety chain to different modes of connection, the safety chain has application with a wide variety of towing and towed vehicles.

We claim:

1. In combination with a grabhook of the type including an elongated shank terminating at one end in a back-turned hook defining a throat opening between the free end of the hook and the shank, a pin extending through the shank, a latch member having a groove at one end and an elongated opening at the other end, the opening receiving the pin for rotatably and shiftably connecting the latch member adjacent the shank, the pin, latch member and hook end being so disposed relative to each other that the latch member may occupy a latched position wherein the pin is at one end of the elongated opening, the hook end is disposed within the groove so as to prevent the latch member from rotating and the throat opening is blocked or may occupy a released position wherein the pin is disposed in the other end of the opening and the hook end is clear of the groove permitting the latch member to be rotated to a position removed from the throat opening.

2. The invention defined in claim 1 wherein the shank is bifurcated at the end remote from the hook and the pin extends through the bifurcations and is adapted to secure a chain link therebetween.

3. The invention defined in claim 1 wherein the elongated opening is keyhole shaped, the large end being said one end and the pin has a shoulder dimensioned to fit only the large end of the opening and bias means acting between the pin and shank to retain the shoulder within the large end of the opening when the latch member is in the latched position but permitting the pin to be shifted to clear the shoulder from the opening to release the latch member and permit it to be shifted to the released position.

4. The invention defined in claim 3 wherein the shank is bifurcated at the end remote from the hook and the pin extends through the furcations and is adapted to secure a chain link therebetween.

5. The invention defined in claim 3 wherein the pin has a retaining nut at one end and the bias means is a compression spring disposed about the pin between the nut and the shank.

6. The invention defined in claim 4 wherein the pin has a retaining nut at one end and the bias means is a compression spring disposed about the pin between the nut and the shank.

7. A hitch safety chain comprising: a length of log chain having a grabhook pivotally connected to a chain link at one end and and enlarged passing link pivotally connected to a chain link at the other end, said passing link having a transverse bend intermediate its ends whereby the portion of the passing link to the side of the bend remote from the log chain may be secured against a flat hitch member surface with the other end of the passing link extending outwardly from the surface presenting a connection about which the end link of the chain may freely pivot and said passing link having an opening large enough to permit passage of the grabhook whereby the safety chain may be looped about a hitch member.

8. In combination with a grabhook of the type including a shank terminating at one end in a back-turned hook defining a throat opening between the end of the hook and the shank, the shank terminating at its other end in an apertured bifurcation, a pin received in the bifurcation adapted to retain a chain link between the furcations, and a latch member mounted on said pin for movement between a latch position blocking the throat opening and a released position permitting ingress and egress through the throat opening and means for releasably holding the latch member in the latched position.

9. The invention defined in claim 8 wherein the last-mentioned means includes spring bias means acting between the pin and the shank.

10. n combination with a grabhook of the type including an elongated shank terminating at one end in a back-turned hook defining a throat opening between the free end of the hook and the shank and apertured furcations at the other end of the shank for receiving a chain link therebetween, a latch including a latch member having one end adapted for engagement with the free end of said hook and an aperture at the other end aligned with the apertures in the furcations, a pin extending through said apertures pivotally connecting the latch member to the grabhook and spring bias means acting between the grabhook and latch member for releasably holding the latch member in engagement with the free end of the grabhook.

11. In combination with a grabhook of the type including an elongated shank terminating at one end in a back-turned hook defining a throat opening between the free end of the hook and said shank and having an aperture at the other end, a safety latch including a latch member having an elongated aperture enlarged at one end and in alignment with the apertures in said shank, said latch member being of sufficient length to span said throat opening and having a recess for receiving the free end of said hook, a pin removably received in said shank and latch member apertures having a head and shoulder at one end adjacent said latch member and a retaining means at the other end, a coil spring acting between said shank and retaining means biasing said head toward said latch member and said latch member having a latched condition wherein the shoulder of the pin is received in the enlarged end of the latch member aperture and the free end of said hook is received in a recess and an unlatched condition wherein the pin shoulder is reciprocated beyond the aperture and the latch member is removed from the free end of the hook with the pin extending through the smaller portion of the aperture.

12. A grabhook comprising an elongated shank having an aperture at one end extending from one side to the other side of the shank, and a back-turned hook at the other end with its free end spaced longitudinally from the aperture and defining a throat with the one side of the shank; a pin having a head on the one side of the shank, a reduced shoulder portion adjacent the head and a shank extending through and being axially shiftable in the aperture; an elongated latch member extending from the pin to a U-shaped free end adapted when in a latched position to have a bight portion underlying and outwardly projecting side portions disposed on opposite sides of the free end of the hook, the latch member having a keyhole slot at its opposite end with a large portion adapted to receive the shoulder for restricting shifting of the latch member and a continuing smaller portion extending longitudinally toward its free end for receiving the shank, the longitudinal length of the slot being sufficient to permit the latch member to shift longitudinally into and out of latch position with the free end of the hook; and means between the pin and shank biasing the head toward the one side.